(12) United States Patent
Lu et al.

(10) Patent No.: US 10,466,429 B1
(45) Date of Patent: Nov. 5, 2019

(54) OPTICAL FIBER MODULE

(71) Applicant: ORANGETEK CORPORATION, Changhua County (TW)

(72) Inventors: Guan-Fu Lu, Changhua County (TW); Chun-Yi Yeh, Changhua County (TW); Chun-Chieh Chen, Changhua County (TW); Chao-Hui Kuo, Changhua County (TW)

(73) Assignee: ORANGETEK CORPORATION, Changhua County (TW)

( * ) Notice: Subject to any disclaimer, the term of this patent is extended or adjusted under 35 U.S.C. 154(b) by 0 days.

(21) Appl. No.: 16/029,733

(22) Filed: Jul. 9, 2018

(51) Int. Cl.
*G02B 6/42* (2006.01)

(52) U.S. Cl.
CPC ......... *G02B 6/4214* (2013.01); *G02B 6/4215* (2013.01)

(58) Field of Classification Search
None
See application file for complete search history.

(56) References Cited

U.S. PATENT DOCUMENTS

| | | | | |
|---|---|---|---|---|
| 4,701,012 A | * | 10/1987 | Kaiser | G02B 6/122 385/24 |
| 6,201,908 B1 | * | 3/2001 | Grann | G02B 6/29358 385/24 |
| 6,396,978 B1 | * | 5/2002 | Grann | G02B 6/29358 385/24 |
| 6,456,757 B2 | * | 9/2002 | Kim | G02B 6/29358 385/24 |
| 6,941,047 B2 | | 9/2005 | Capewell et al. | |
| 6,945,711 B2 | * | 9/2005 | Chen | G02B 6/2938 385/93 |
| 9,692,516 B2 | * | 6/2017 | Zhou | H04B 10/40 |
| 9,753,223 B2 | * | 9/2017 | Yang | G02B 6/28 |
| 9,794,017 B2 | * | 10/2017 | O'Daniel | G02B 6/4219 |
| 9,841,564 B1 | * | 12/2017 | Lin | G02B 6/29365 |
| 9,967,037 B2 | * | 5/2018 | Bitauld | H04B 10/70 |
| 2003/0063844 A1 | * | 4/2003 | Caracci | G02B 6/29362 385/24 |
| 2018/0017735 A1 | * | 1/2018 | Miao | G02B 6/29365 |

FOREIGN PATENT DOCUMENTS

WO        WO-2011008041 A2 *  1/2011  .........  G02B 6/29364

* cited by examiner

*Primary Examiner* — Rhonda S Peace

(57) ABSTRACT

An optical fiber module contains: a circuit board, a photoelectric assembly, a control assembly, a body, and a light transmission set. The body includes a first accommodation groove, a second accommodation groove accommodating the optoelectronic assembly, a first reflection portion facing the circuit board, a lens set accommodated in the second accommodation groove and aligning with the first reflection portion, a guide orifice, a converging lens extending from the guide orifice, and a second reflection portion adjacent to the converging lens, wherein the second reflection portion has a second reflecting face corresponding to the converging lens. The light transmission set includes multiple passing faces formed on a first surface thereof so as to face and correspond to the first reflection portion of the body, and the light transmission set includes multiple complete reflecting faces formed on a second surface thereof away from the multiple passing faces individually.

10 Claims, 5 Drawing Sheets

OPTICAL FIBER MODULE

FIELD OF THE INVENTION

The present invention relates to a light transmission technology, and more particularly to an optical fiber module which is capable of slitting and gathering lights.

BACKGROUND OF THE INVENTION

A conventional optical fiber disclosed in U.S. Pat. No. 6,941,047 contains a glass piece on which multiple filter films 200a-200d are attached, and the multiple filter films correspond to multiple prisms 230 respectively so that after lights enter into the glass piece from external environment, they are reflected by the multiple filter films to penetrate out of the multiple prisms. Because a gap is defined among the multiple prisms and filter films, the lights lose as passing through multiple mediums. Furthermore, angles of the multiple prisms are fixed respectively, so the lights of different wavelengths have various refractions when passing through the multiple prisms, thus increasing energy loss.

The present invention has arisen to mitigate and/or obviate the afore-described disadvantages.

SUMMARY OF THE INVENTION

The primary aspect of the present invention is to provide an optical fiber module which loses less energy.

To obtain the above aspect, an optical fiber module provided by the present invention contains: a circuit board, a photoelectric assembly, a control assembly, a body, and a light transmission set.

The optoelectronic assembly is arranged on the circuit board. The control assembly is arranged on a surface of the circuit board and is configured to control the optoelectronic assembly. The body is fixed on the surface of the circuit board on which the optoelectronic assembly is arranged, and the body includes a first accommodation groove formed on a first surface of the body opposite to the optoelectronic assembly, a second accommodation groove defined on a second surface of the body and accommodating the optoelectronic assembly, a first reflection portion formed in the first accommodation groove and facing the circuit board, a lens set accommodated in the second accommodation groove, extending to the circuit board and aligning with the first reflection portion, a guide orifice formed on a side of the body, a converging lens extending from a bottom of the guide orifice, and a second reflection portion extending from a side of the second accommodation groove adjacent to the converging lens, wherein the second reflection portion has a second reflecting face corresponding to the converging lens. The light transmission set is housed in the first accommodation groove of the body, and the light transmission set includes multiple passing faces formed on a first surface of the light transmission set so as to face and correspond to the first reflection portion of the body, and multiple complete reflecting faces formed on a second surface of the light transmission set away from the multiple passing faces individually so that the multiple complete reflecting faces respectively reflect multiple separated lights to the second reflecting face or the second reflecting face reflects the multiple separated lights to the multiple complete reflecting faces individually.

Preferably, the first reflection portion has multiple first reflecting zones, each of the multiple first reflecting zones has a cross section in an inverted triangle shape, and the multiple first reflecting zones respectively have multiple first reflecting faces.

Preferably, the second reflecting face of the second reflection portion is oblique.

Preferably, the light transmission set further includes multiple light conduction elements.

Preferably, the multiple light conduction elements respectively have the multiple passing faces so that the multiple separated lights of different wavelengths individually pass through the multiple passing faces of the multiple light conduction elements.

Preferably, the multiple light conduction elements are an optical filter.

Preferably, the optoelectronic assembly has multiple photoelectric elements.

Preferably, the multiple photoelectric elements are light emitting elements respectively.

Preferably, the multiple photoelectric elements are edge-emitting laser elements or surface-emitting laser elements respectively.

Preferably, the multiple photoelectric elements are light detection elements individually.

DETAILED DESCRIPTION OF THE PREFERRED EMBODIMENTS

Figure 1:
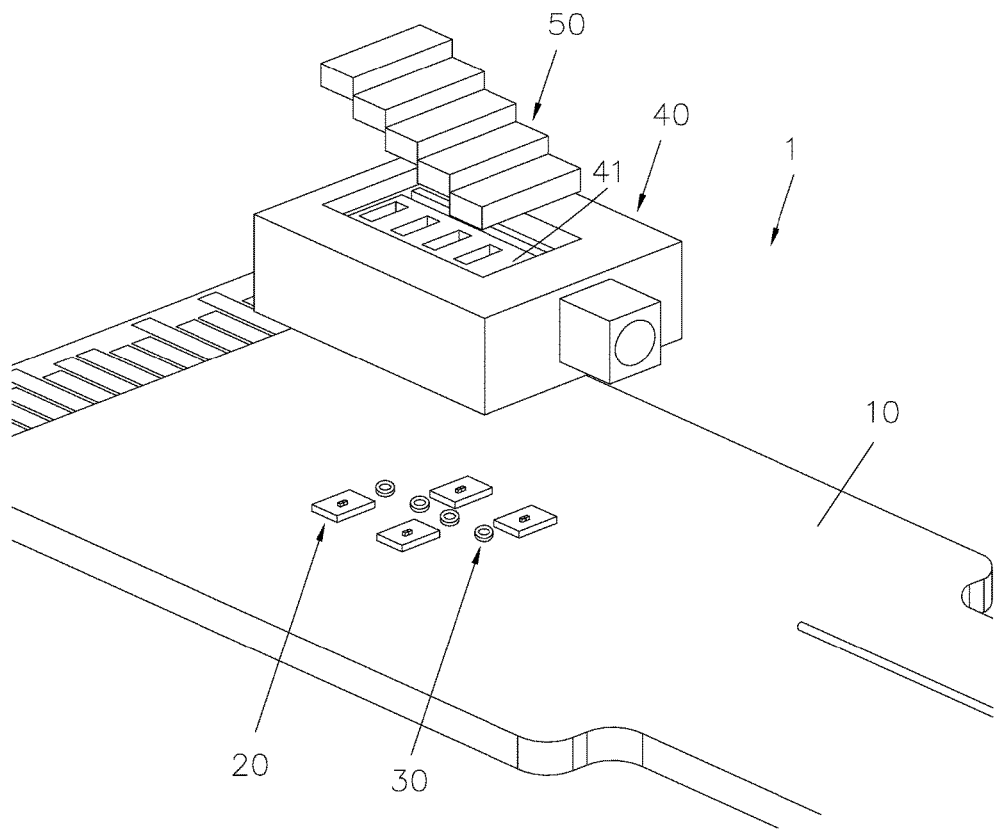
FIG. 1 is a perspective view showing the exploded components of an optical fiber module according to a first embodiment of the present invention.
Figure 2:
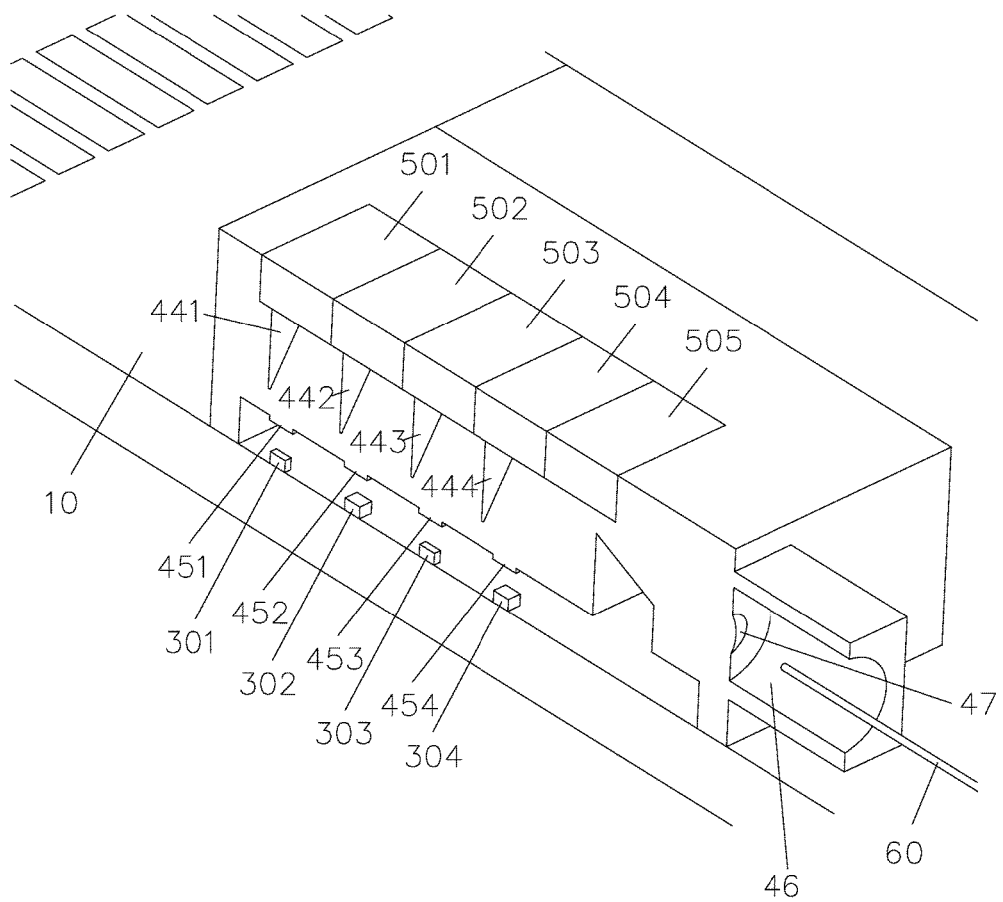
FIG. 2 is a cross-sectional perspective view showing the assembly of the optical fiber module according to the first embodiment of the present invention.
Figure 3:
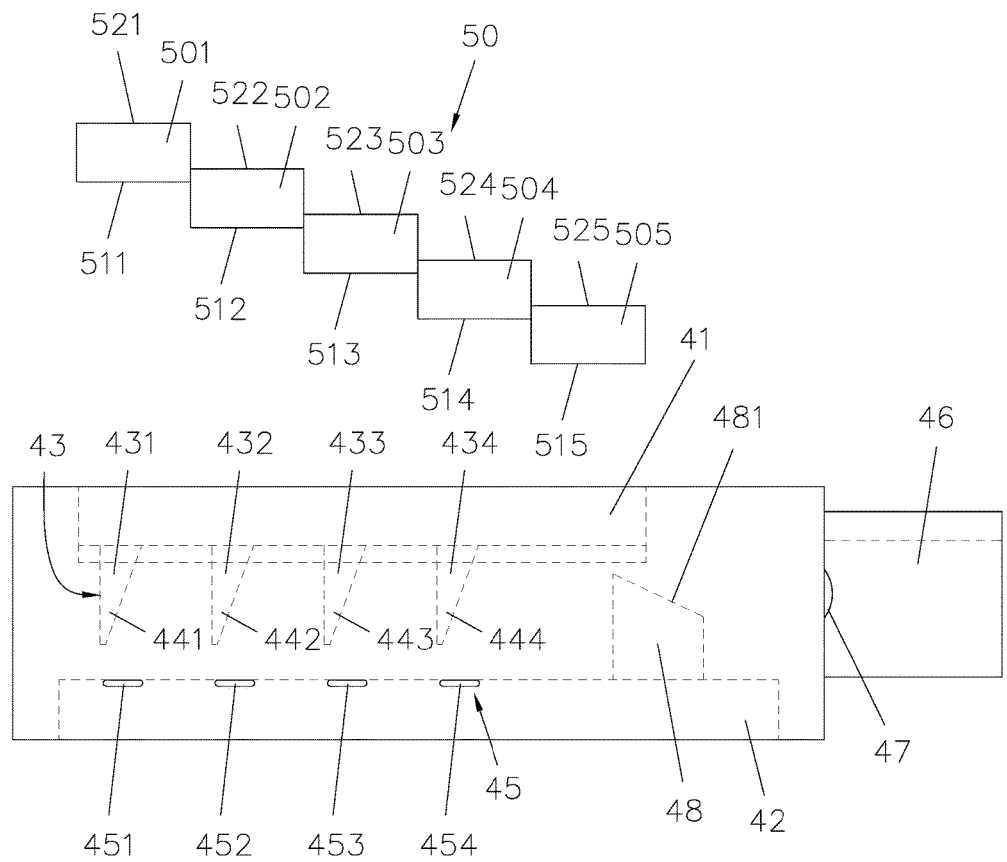
FIG. 3 is a cross sectional view showing the assembly of the optical fiber module according to the first embodiment of the present invention.

With reference to FIGS. 1-3, an optical fiber module 1 according to a first embodiment of the present invention comprises: a circuit board 10, a control assembly 20, a photoelectric assembly 30, a body 40, and a light transmission set 50.

The circuit board 10 includes the control assembly 20 and the optoelectronic assembly 30 which are arranged on the circuit board 10, wherein the control assembly 20 is configured to control the optoelectronic assembly 30. In this embodiment, the control assembly 20 has four controlling elements 201-204, and the optoelectronic assembly 30 has four photoelectric elements 301-304 which are light emitting elements (such as edge-emitting laser element, surface-emitting laser elements), light-emitting diodes or other light sources (such as light detectors) individually. In addition, the four photoelectric elements 301-304 respectively transmit four separated lights L1-L4 of different wavelengths.

The body 40 is fixed on a surface of the circuit board 10 on which the optoelectronic assembly 30 is arranged. In this embodiment, the body 40 includes a first accommodation groove 41 formed on a first surface thereof opposite to the optoelectronic assembly 30, a second accommodation groove 42 defined on a first surface of the body 40 and accommodating the optoelectronic assembly 30 and the control assembly 20, and a first reflection portion 43 formed in the first accommodation groove 41 and facing the circuit board 10, wherein the first reflection portion 43 has four first reflecting zones 431-434, each of the four first reflecting zones 431-434 has a cross section in an inverted triangle shape, and the four first reflecting zones 431-434 respectively have four first reflecting faces 441-444 corresponding to the four photoelectric elements 301-304 individually.

The second accommodation groove 42 of the body 40 has a lens set 45 extending to the circuit board 10. In this embodiment, the lens set 45 has four first lenses 451-454 respectively aligning with the four first reflecting faces 441-444, and the four first lenses 451-454 are a collimating lens. The body 40 further includes a guide orifice 46 formed on a side thereof and accommodating an optical fiber 60, a converging lens 47 extending from a bottom of the guide orifice 46, and a second reflection portion 48 extending from a side of the second accommodation groove 42 adjacent to the converging lens 47, wherein the second reflection portion 48 has a second reflecting face 481 which is oblique and faces the first accommodation groove 41.

The light transmission set 50 is housed in the first accommodation groove 41 and includes multiple light conduction elements. In this embodiment, the light transmission set 50 includes five light conduction elements 501-505 which respectively have five passing faces 511-515 formed on first surfaces of the five light conduction elements 501-505 and facing the optoelectronic assembly 30 so as to filter the four separated lights L1-L4 which transmit into or out of the five light conduction elements 501-505 individually. The five light conduction elements 501-505 respectively have five complete reflecting faces 521-525 formed on second surfaces thereof opposite to the five passing faces 511-515 individually so as to reflect the four separated lights L1-L4 respectively, wherein the five light conduction elements 501-505 are an optical filter.

Figure 4:
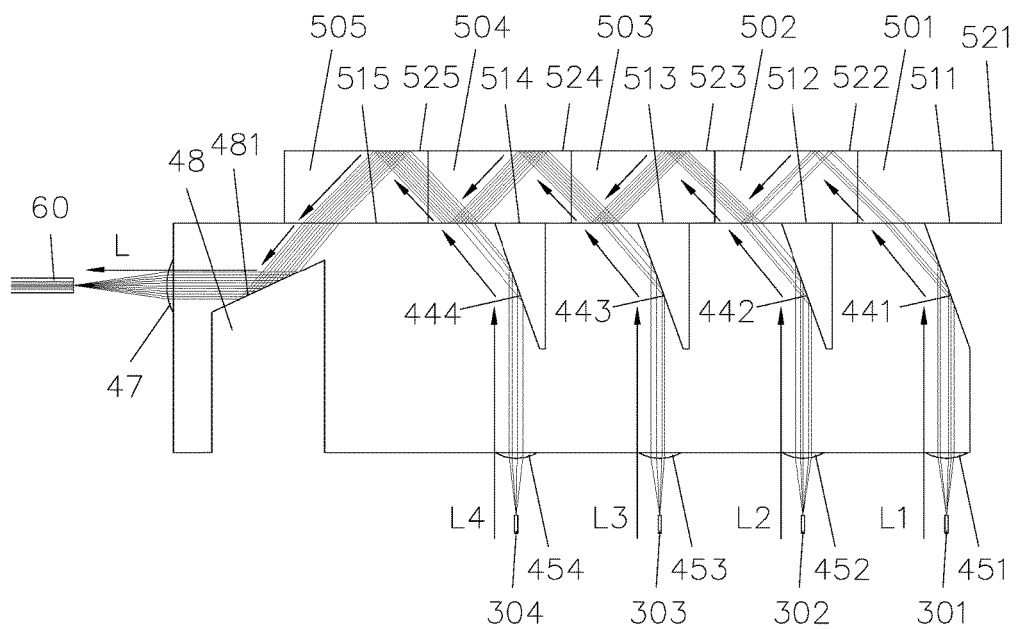
FIG. 4 is a schematic view showing the operation of the optical fiber module according to the first embodiment of the present invention.

Referring to FIG. 4, when the four separated lights L1-L4 transmit out of the four photoelectric elements 301-304, they enter the five light conduction elements 501-505 individually from the four first lenses 451-454 via the four first reflecting faces 441-444 of the four first reflecting zones 431-434, and the four separated lights L1-L4 reflect from the five complete reflecting faces 521-525 after entering the five light conduction elements 501-505 so that the four separated lights L1-L4 produce a combined light L after passing through the five light conduction elements 501-505. Thereafter, the combined light L transmits into the optical fiber 60 from the converging lens 47 through the guide orifice 46, after reflecting from the second reflecting face 481 of the second reflection portion 48.

Figure 5:
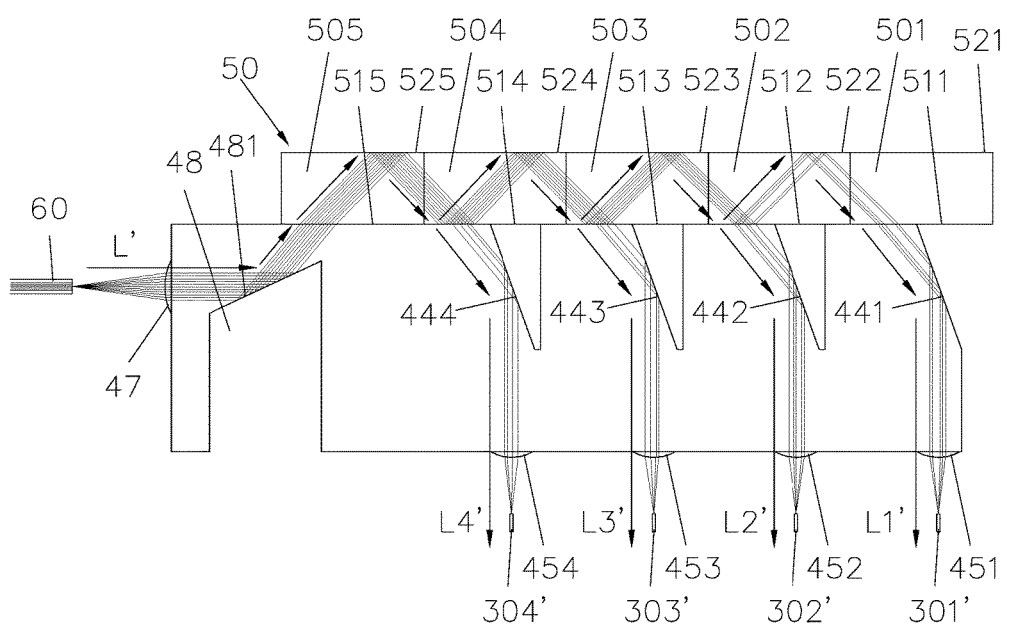
FIG. 5 is a schematic view showing the operation of an optical fiber module according to a second embodiment of the present invention.

As illustrated in FIG. 5, a difference of an optical fiber module 1 of a second embodiment from that of the first embodiment comprises: the optoelectronic assembly 30 being multiple light detectors 301'-304' configured to detect intensity of a combined light L' outputted from the five light conduction elements 501-505.

After the combined light L' reflects to the second reflecting face 481 of the second reflection portion 48 from the optical fiber 60 via the converging lens 47, the combined light L' transmits into the light transmission set 50 via a light conduction element 505 (i.e., one of the five light conduction elements 501-505) and is reflected by the five complete reflecting faces 525-521 of the five light conduction elements 505-501, then the four separated lights L1'-L4' of different wavelengths in the combined light L' individually transmit out of four passing faces 514-511 so that the four separated lights L1'-L4' respectively gather and illuminate to four photoelectric elements 304-301 via four first lenses 454-451, thus detecting intensity of the four separated lights L1'-L4'.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An optical fiber module comprising:
   a circuit board;
   an optoelectronic assembly arranged on the circuit board;
   a control assembly arranged on a surface of the circuit board and configured to control the optoelectronic assembly;
   a body fixed on the surface of the circuit board on which the optoelectronic assembly is arranged, the body including a first accommodation groove formed on a first surface of the body opposite to the optoelectronic assembly, a second accommodation groove defined on a second surface of the body and accommodating the optoelectronic assembly, a first reflection portion formed in the first accommodation groove and facing the circuit board, a lens set accommodated in the second accommodation groove, extending to the circuit board and aligning with the first reflection portion, a guide orifice formed on a side of the body, a converging lens extending from a bottom of the guide orifice, and a second reflection portion extending from a side of the second accommodation groove adjacent to the converging lens, wherein the second reflection portion has a second reflecting face corresponding to the converging lens; and
   a light transmission set housed in the first accommodation groove of the body, and the light transmission set including multiple passing faces formed on a first surface of the light transmission set so as to face and correspond to the first reflection portion of the body, and multiple complete reflecting faces formed on a second surface of the light transmission set away from the multiple passing faces individually so that the multiple complete reflecting faces respectively reflect multiple separated lights to the second reflecting face or the second reflecting face reflects the multiple separated lights to the multiple complete reflecting faces individually,
   wherein the multiple passing faces refract the multiple separated lights reflecting from the multiple complete reflecting faces or from the second reflecting face;
   wherein the first reflection portion has multiple first reflecting zones, each of the multiple first reflecting zones has a cross section in an inverted triangle shape, and the multiple first reflecting zones respectively have multiple first reflecting faces.

2. The optical fiber module as claimed in claim 1, wherein the second reflecting face of the second reflection portion is oblique.

3. The optical fiber module as claimed in claim 1, wherein the light transmission set further includes multiple light conduction elements.

4. The optical fiber module as claimed in claim 3, wherein the multiple light conduction elements respectively have the multiple passing faces so that the multiple separated lights of different wavelengths individually pass through the multiple passing faces of the multiple light conduction elements.

5. The optical fiber module as claimed in claim 4, wherein the multiple light conduction elements are an optical filter.

6. The optical fiber module as claimed in claim 1, wherein the optoelectronic assembly has multiple photoelectric elements.

7. The optical fiber module as claimed in claim 6, wherein the multiple photoelectric elements are light emitting elements respectively.

8. The optical fiber module as claimed in claim 7, wherein the multiple photoelectric elements are edge-emitting laser elements or surface-emitting laser elements respectively.

9. The optical fiber module as claimed in claim 6, wherein the multiple photoelectric elements are light detection elements individually.

10. An optical fiber module comprising:
a circuit board;
an optoelectronic assembly arranged on the circuit board;
a control assembly arranged on a surface of the circuit board and configured to control the optoelectronic assembly;
a body fixed on the surface of the circuit board on which the optoelectronic assembly is arranged, the body including a first accommodation groove formed on a first surface of the body opposite to the optoelectronic assembly, a second accommodation groove defined on a second surface of the body and accommodating the optoelectronic assembly, a first reflection portion formed in the first accommodation groove and facing the circuit board, a lens set accommodated in the second accommodation groove, extending to the circuit board and aligning with the first reflection portion, a guide orifice formed on a side of the body, a converging lens extending from a bottom of the guide orifice, and a second reflection portion extending from a side of the second accommodation groove adjacent to the converging lens, wherein the second reflection portion has a second reflecting face corresponding to the converging lens; and
a light transmission set housed in the first accommodation groove of the body, and the light transmission set including multiple passing faces formed on a first surface of the light transmission set so as to face and correspond to the first reflection portion of the body, and multiple complete reflecting faces formed on a second surface of the light transmission set away from the multiple passing faces individually so that the multiple complete reflecting faces respectively reflect multiple separated lights to the second reflecting face or the second reflecting face reflects the multiple separated lights to the multiple complete reflecting faces individually,
wherein the multiple passing faces refract the multiple separated lights reflecting from the multiple complete reflecting faces or from the second reflecting face;
wherein the light transmission set further includes multiple light conduction elements;
wherein the multiple light conduction elements respectively have the multiple passing faces so that the multiple separated lights of different wavelengths individually pass through the multiple passing faces of the multiple light conduction elements;
wherein the multiple light conduction elements are an optical filter.

\* \* \* \* \*